No. 644,454. Patented Feb. 27, 1900.
P. N. PETERSEN.
BAND CUTTER AND FEEDER.
(Application filed Aug. 1, 1899.)
(No Model.) 2 Sheets—Sheet 1.
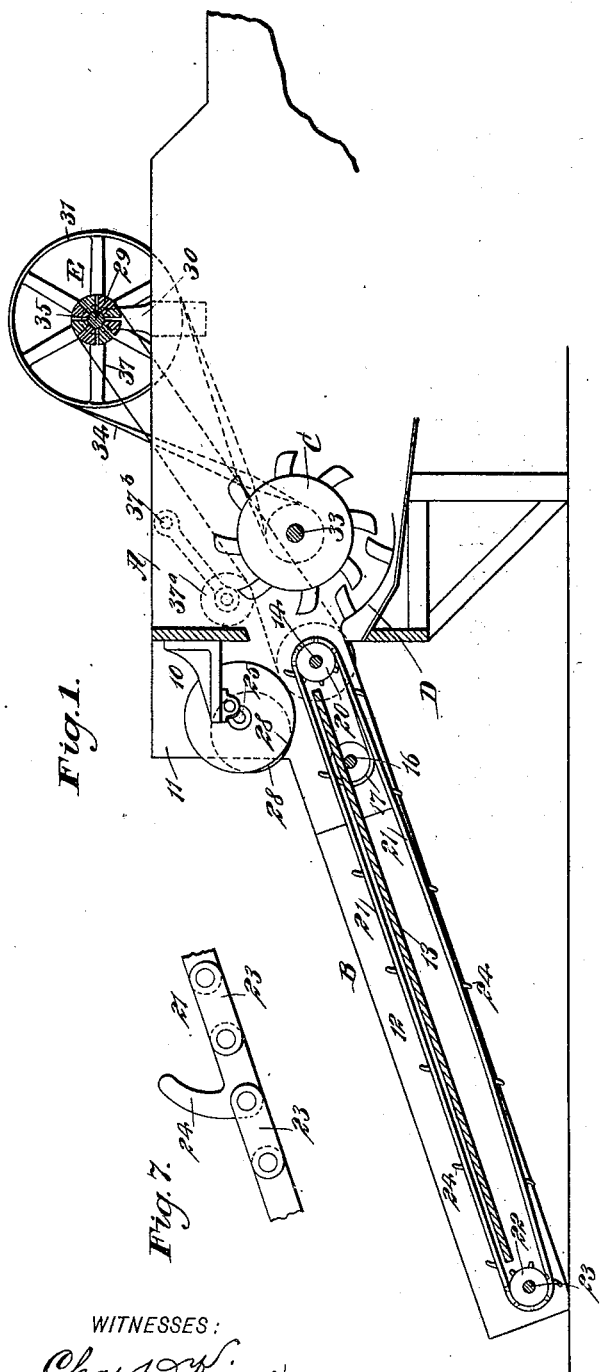
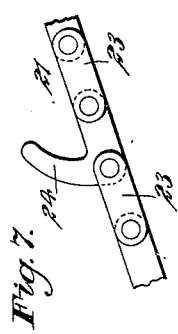
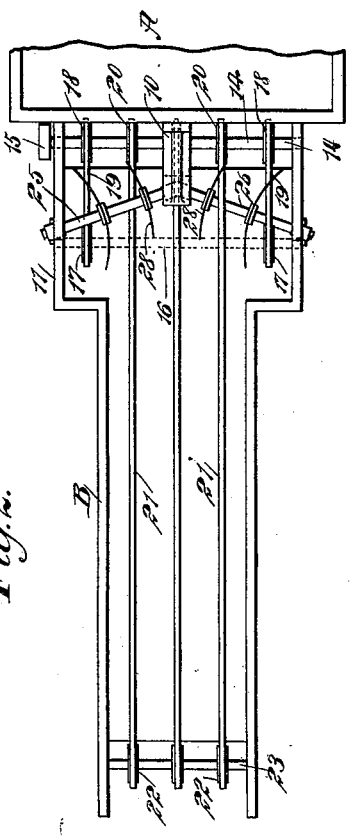
WITNESSES:
Chas. D. King
J. Fred Acker
INVENTOR
P. N. Petersen
BY
ATTORNEYS

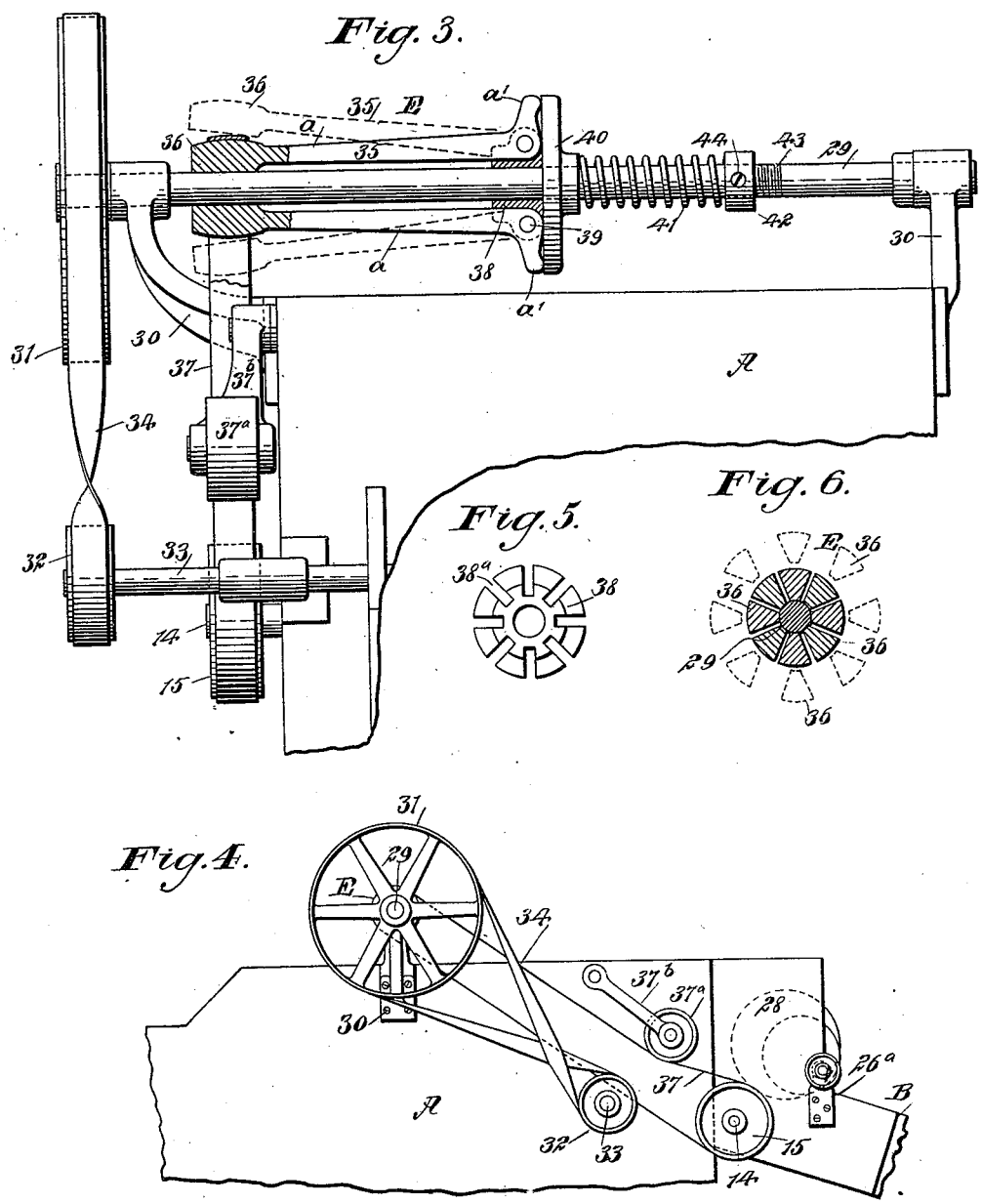

UNITED STATES PATENT OFFICE.

PETER N. PETERSEN, OF HERMAN, NEBRASKA.

BAND-CUTTER AND FEEDER.

SPECIFICATION forming part of Letters Patent No. 644,454, dated February 27, 1900.

Application filed August 1, 1899. Serial No. 725,738. (No model.)

*To all whom it may concern:*

Be it known that I, PETER N. PETERSEN, of Herman, in the county of Washington and State of Nebraska, have invented a new and Improved Band-Cutter and Feeder, of which the following is a full, clear, and exact description.

One object of my invention is to provide a very simple form of band-cutter and feeder that will be exceedingly durable and effective and that will spread every bundle the full width of the cylinder without tangling or feeding crosswise.

Another object of the invention is to construct a band-cutter and feeder attachment for threshing-machines that will comprise but few movable parts, rendering the attachment light in weight and less liable to disorder and breakage than similar attachments now in use.

A further object of the invention is to provide a means for obtaining an automatic variation of speed and consequent regulation of the amount of grain fed per revolution of the cylinder.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a longitudinal vertical section through the cylinder end of the threshing-machine and through the band-cutter and feeder attachment. Fig. 2 is a plan view of the band-cutter and feeder and a portion of the cylinder end of the threshing-machine. Fig. 3 is an enlarged view illustrating a partial front elevation of the cylinder end of the feeder and particularly showing a governor-shaft and a segmental or expansion pulley carried by said shaft, the pulley and the device for attaching the pulley to the shaft being shown in section. Fig. 4 is a side elevation of the cylinder end of the threshing-machine, illustrating the connection between the governor-shaft, cylinder-shaft, and feed-shaft. Fig. 5 is an end view of the device employed for attaching the expansion-pulley to the governor-shaft. Fig. 6 is a transverse section through the belt-receiving surface of the expansion-pulley and the governor-shaft, illustrating in dotted lines the manner in which the segments of the pulley are separated by centrifugal motion from the said governor-shaft, and Fig. 7 is a detail side elevation of a portion of one of the feeder-belts.

A represents the cylinder end of a threshing-machine; B, the frame for the feed device; C, the cylinder of the threshing-machine, and D the concave of said machine. The frame of the feed device B of the cylinder C is so constructed that all the grain supplied to the cylinder by the feed mechanism will be acted upon in a thorough manner by the cylinder and the concave. The upper end 11 of the said frame B is, however, wider than its body or lower portion and of a width equal to the length of the cylinder, and part of the wider portion 11 of said frame B is preferably made to extend to the upper edge of the cylinder end of the threshing-machine, as shown in Fig. 1. A bracket or hanger 10, provided with a suitable box, is secured to the central portion of the forward end of the threshing-machine between the sides of the wider portion 11 of the frame B of the feeding mechanism. The frame of the feeding mechanism consists of two side pieces 12, connected at their centers by a horizontal board 13, and at the upper end of the said frame B, adjacent to the concave D, a feed-shaft 14 is suitably mounted to revolve, being provided at one of its ends with a pulley 15. A second shaft 16 is mounted to revolve in the frame B between the lower end of the frame and the main feed-shaft 14, the said shaft 16, however, being within the wider portion of the said frame, as illustrated in Fig. 2. The shaft 16 is provided near each end with a sprocket-wheel 17, and the wheels 17 carry feed-belts 19, which belts pass over sprocket-wheels 18, secured near the end portions of the main feed-shaft 14, as shown best in Fig. 2. Intermediate sprocket-wheels 20 are secured on the main shaft 14, all the sprocket-wheels on said shaft being at equal distances apart, and feed-belts 21 are passed over the intermediate sprocket-wheels 20 and over sprocket-wheels 22, located on a shaft 23, mounted to revolve at the lower front portion of the feed-frame, as shown in Figs. 1 and 2. All of the feed-belts 19 and 21 are of like construction, consisting of a series of pivotally-connected links 23, as shown in Fig. 7, and various of the links are provided with spurs 24, that extend upward and are curved in direction of the cylinder end of the threshing-machine. These spurs 24 are adapted to convey the grain to the cutters, to be hereinafter described, and likewise to the cylinder and concave, and it will be observed that the various feed-belts are independent of each other. The feed-belts 21 are the main feed-belts and carry the grain directly to the band-cutters, while the shorter feed-belts 19 assist in moving the cut grain from the cutters to the cylinder.

Two cutter-shafts 25 and 26 are journaled at their inner ends in a box or boxes attached to the hanger or bracket 10, as shown in Fig. 2. The cutter-shafts 25 and 26 are at angles to each other, their outer ends being further removed from the cylinder portion of the threshing-machine than their inner ends, and the outer ends of the shafts are journaled in suitable bearings 26$^a$, attached to the wider portion of the frame of the feed mechanism.

The cutters 28, attached to the shafts 25 and 26, are of disk shape, their inner faces being convexed and their outer faces concaved, and the disk cutters 28 are graduated in size, the largest cutters being nearest the outer ends of the shafts, to which they are secured, as is best shown in Fig. 2. The cutters are so attached to the shafts 25 and 26 that their front edges are brought parallel to each other, as is clearly shown in Fig. 2; but the rear edges of the two central or larger disk cutters diverge to a marked degree. These cutters by reason of their shape and position not only serve to cut the grain and the bands thereof, but likewise act to spread the grain. The relative size of the disks may be changed to suit various kinds of grain.

In connection with the feed-shaft 14 I employ a governor-shaft 29, which shaft is shown in Figs. 1, 3, and 4 as mounted upon the threshing-machine at the rear of the cylinder C in bearings 30, secured to the side portions of the threshing-machine. A large pulley 31 is secured to the governor-shaft at one of its ends, and this pulley is connected by a cross-belt 34 with a scroll-pulley 32, secured upon the cylinder-shaft 33. An expansion segmental pulley E is carried by the governor-shaft, and this expansion or segmental pulley preferably consists of a series of bell-cranks 35, which are usually eight in number, and each bell-crank consists of one long arm $a$, that extends parallel with the shaft, and a short arm $a'$, that is at an angle to the shaft, and the longer arm of each bell-crank 35 is provided at its free end or end nearest the pulley 31 with an enlargement 36, and the enlarged surfaces 36 of the bell-cranks serve as bearings for a belt 37, that is likewise passed over the pulley 15 on the feed-shaft, as shown in Figs. 3 and 4, and this belt is kept normally in proper relation to the pulleys over which it is passed by means of an idler 37$^a$ engaging with the upper stretch of the belt and mounted to turn upon an arm 37$^b$, pivoted to the side of the threshing-machine frame. The belt 37 is of sufficient length to permit of the expansion of the segments of the pulley, the weight of the idler 37$^a$ taking up the slack and maintaining the belt at all times at sufficient tension to drive the pulleys over which it passes.

A collar 38 is secured upon the governor-shaft 29, and this collar is made in two diameters, as shown in Figs. 3 and 5. The collar is provided with a number of peripheral slots 38$^a$, corresponding to the number of bell-cranks 35 of the expansion or segmental pulley, and these cranks are pivotally attached to the collar by means of pins 39, passed through the bell-cranks, where their members intersect, and across the slots into which the bell-cranks are pivoted.

A disk 40 is mounted to slide on the governor-shaft and engage with the shorter members or arms $a'$ of the bell-cranks of the expansion or segmental pulley E, as is particularly shown in Fig. 3. A spring 41 is coiled around the governor-shaft, having bearing at one end against the disk 40 and at the other end against the nut 42, that is adjustable on the governor-shaft, said shaft having a threaded surface 43 to receive the said nut, and the nut is held in adjusted position by a set-screw 44 or its equivalent. The tension of the spring 41 is regulated by the adjustment of the nut 42. The pressure of the spring 41 will hold the segments of the pulley together until the centrifugal force of the segments becomes greater than the resistance of the spring, whereupon they will spread apart and increase the diameter of the circle in which they move, as shown in dotted lines in Figs. 3 and 6, thus greatly increasing the speed of the feeder and the amount of grain fed per revolution of the cylinder. The feed-shafts are belted in a manner that will impart to them a very slow movement.

By employing independent feed-chains there are no slats to work loose and break and less chance for loose grain to be carried back under the feeder to be wasted. Moreover, when the cylinder draws the grain from the feeder, as it will when the grain is a little damp, that part of the grain between the chains will be drawn first by reason of the chains having a firm hold through their spurs 24 on the straw immediately over them, and in this manner the straw is effectually parted.

By using the concave circular cutters their front edges may be brought parallel to each other, thus effecting an easy entrance through the grain; while immediately behind this point the disks diverge, thus spreading the grain as it is drawn between them by the feed-chains. The concave form of cutters also assists the cutters in lifting and loosening the grain at the rearward portion of their peripheries, imparting to the grain a rolling motion. The governor employed causes the speed of the feeder beyond a certain point to increase faster than the speed of the cylinder increases. The shafts 25 and 26 are revolved by the frictional engagement of the grain with the lower edges of the disks 28.

Having thus described my invention, I claim as new and desire to secure by Letters Patent—

1. In a band-cutter and feeder, a feed-trough, a series of independent feed-belts located within said trough, some of said feed-belts being of greater length than the others, means for driving said feed-belts, spurs projecting from said feed-belts and curved in direction of the delivery ends of the belts, cutter-shafts journaled above the feed-belts at angles to each other, and disk cutters secured upon the said shaft, substantially as described.

2. In a band-cutter and feeder, a feed-trough having its upper end of greater width than the lower or body portion of the trough, a bracket or hanger supported between the sides of the wider portion of the trough, cutter-shafts arranged at angles to each other and journaled at their outer ends in bearings carried by the sides of the wider portion of the trough, and at their inner ends in bearings carried by the said bracket, and feed-belts located in the said trough, some of said feed-belts being of greater length than others, substantially as described.

3. In a band-cutter and feeder, a feed-trough having its upper end of greater width than the lower or body portion of the trough, independent feed-belts located in the said trough and extending the full length thereof, shorter feed-belts arranged only within the wider portion of the trough and between the longer feed-belts and the sides of the trough, and cutters located above the belts at the wider portion of the trough, substantially as set forth.

4. In a band-cutter and feeder, a feed-trough having its upper end of greater width than the lower or body portion of the trough, independent feed-belts located within the said trough, some of said feed-belts extending the full length of the trough and some of them being shorter and arranged only within the wider portion of the trough, cutter-shafts located at the wider portion of the feed-trough and journaled above the feed-belts, the said cutter-shafts being at angles to each other, and concave disk cutters secured upon the said shafts and having their front edges parallel to each other and their rear edges diverging, for the purpose set forth.

5. In a band-cutter and feeder, cutter-shafts journaled at angles to one another, and concave disk cutters secured upon the said shafts and having their front edges parallel to each other and their rear edges diverging, the said cutters being graduated in size, substantially as shown and described.

6. In a band-cutter and feeder the combination with a feed-trough and feed-belts located within said trough, of cutter-shafts journaled above the feed-belts at angles to each other, and disk cutters secured upon the said shaft and having their front edges parallel to each other and their rear edges diverging, the said cutters being graduated in size and having their inner faces convexed and their outer faces concaved, substantially as set forth.

7. In a band-cutter and feeder, the combination, with a feed-trough, a series of independent chain feed-belts located within said trough, means for driving the said belts, spurs projected from the said belts, and cutter-shafts journaled above the feed-belts at angles to each other, and concave disk cutters secured upon the said shaft, having their front edges parallel to each other and their rear edges diverging, for the purpose set forth.

8. In a band-cutter and feeder, a feed-shaft, a governor-shaft, and an expansion-pulley carried by the governor-shaft and consisting of a series of segments pivotally connected with the governor-shaft and controlled by centrifugal force, said expansion-pulley being in belt connection with the feed-shaft, as described.

9. In a band-cutter and feeder, a feed-shaft, a governor-shaft, means for rotating the governor-shaft, an expansion-pulley comprising a series of segments arranged around the governor-shaft and pivoted to move toward and from the same the said pulley being controlled by centrifugal force, a belt connecting said expansion-pulley with the feed-shaft, and means for keeping the belt normally in proper relation to the pulleys over which it passes, substantially as described.

10. In a band-cutter and feeder, the combination, with a feed-shaft, a drive-shaft, and a governor-shaft belted to the drive-shaft, of a slotted collar secured to the governor-shaft, an expansion-pulley consisting of a series of segmental bell-crank levers, each lever comprising a long arm extending along the shaft and having an enlargement at its free end, and a short arm at an angle to the shaft, the said bell-cranks being pivoted in the slots of said collars at the junction of their members, and a spring-controlled follower having bearing against the shorter members of the said bell-cranks, the enlarged surfaces of the cranks being arranged for belt connection with the said feed-shaft, as and for the purpose specified.

11. In a band-cutter and feeder, the combination with a feed-shaft, of a governor-shaft, means for rotating the governor-shaft, an expansion-pulley consisting of a series of bell-crank levers each having a long arm extending along the shaft and provided with a segmental head at its free end, and a short arm extending at an angle to the long arm, the said levers at the junction of their members being pivotally connected with the shaft, a spring-controlled device engaging the short arms of the levers to normally hold the parts of the pulley together, and a belt connecting the segmental heads of the levers with the feed-shaft, substantially as set forth.

12. The combination with the feed-shaft, the cylinder and concave, and the feed-belts for feeding the grain to the cylinder, of a governor-shaft, a pulley on said governor-shaft, a belt connection between the said pulley and the cylinder-shaft and an expansion-pulley carried by the governor-shaft and consisting of a series of segments pivotally connected with the governor-shaft and controlled by centrifugal force, said expansion-pulley being in belt connection with the feed shaft, substantially as described.

PETER N. PETERSEN.

Witnesses:
    D. BRODERSON,
    N. A. JESPERSEN.